US010663688B2

(12) United States Patent
Safranek et al.

(10) Patent No.: US 10,663,688 B2
(45) Date of Patent: May 26, 2020

(54) STUBBED TERMINAL HOUSING FOR COMMUNICATIONS VAULT OR PEDESTAL

(71) Applicant: CHANNELL COMMERCIAL CORPORATION, Temecula, CA (US)

(72) Inventors: Timothy S. Safranek, Murrieta, CA (US); Robert H. Gwillim, Temecula, CA (US); John C. Summers, Temecula, CA (US)

(73) Assignee: Channell Commerical Corporation, Temecula, CA (US)

( * ) Notice: Subject to any disclaimer, the term of this patent is extended or adjusted under 35 U.S.C. 154(b) by 0 days.

(21) Appl. No.: 15/473,448

(22) Filed: Mar. 29, 2017

(65) Prior Publication Data

US 2017/0315322 A1 Nov. 2, 2017

Related U.S. Application Data

(60) Provisional application No. 62/329,050, filed on Apr. 28, 2016.

(51) Int. Cl.
*G02B 6/00* (2006.01)
*G02B 6/50* (2006.01)
*G02B 6/44* (2006.01)

(52) U.S. Cl.
CPC .......... *G02B 6/504* (2013.01); *G02B 6/4451* (2013.01); *G02B 6/4472* (2013.01)

(58) Field of Classification Search
CPC ..... G02B 6/4471; G02B 6/504; G02B 6/4451
See application file for complete search history.

(56) References Cited

U.S. PATENT DOCUMENTS

| 5,133,038 | A | * | 7/1992 | Zipper | G02B 6/4248 174/50 |
|---|---|---|---|---|---|
| 7,381,888 | B2 | | 6/2008 | Burke et al. | |
| 7,385,137 | B2 | | 6/2008 | Burke et al. | |
| 7,418,183 | B2 | * | 8/2008 | Wittmeier | G02B 6/4442 385/134 |
| 7,522,805 | B2 | * | 4/2009 | Smith | G02B 6/4452 385/135 |
| 8,249,411 | B2 | | 8/2012 | Burke | |
| 8,606,067 | B2 | * | 12/2013 | Solheid | G02B 6/4452 385/135 |
| 8,847,070 | B2 | * | 9/2014 | Burke | G02B 6/4451 174/37 |
| 9,042,702 | B2 | * | 5/2015 | Rodriguez | G02B 6/36 385/136 |
| 9,519,118 | B2 | * | 12/2016 | Giraud | G02B 6/4452 |
| 9,547,145 | B2 | * | 1/2017 | Cox | G02B 6/4452 |
| 2002/0050519 | A1 | * | 5/2002 | Oliva | G06K 7/10574 235/454 |
| 2005/0175307 | A1 | * | 8/2005 | Battey | G02B 6/3897 385/135 |

(Continued)

*Primary Examiner* — Ellen E Kim
(74) *Attorney, Agent, or Firm* — Lewis Roca Rothgerber Christie LLP

(57) ABSTRACT

A stubbed terminal housing for fiber optic cable management in a utility vault or pedestal housing having a body portion, a cavity within the body portion, a plurality of fiber optic fiber ports extending from the body portion for entry and exiting of fiber optic fibers, and a mounting portion extending from the body portion for attaching the stubbed terminal housing to the utility vault or pedestal housing.

13 Claims, 5 Drawing Sheets

(56) References Cited

U.S. PATENT DOCUMENTS

| | | | |
|---|---|---|---|
| 2005/0207711 A1* | 9/2005 | Vo | G02B 6/4444 |
| | | | 385/94 |
| 2009/0238530 A1* | 9/2009 | Wakileh | G02B 6/4442 |
| | | | 385/135 |
| 2010/0061687 A1* | 3/2010 | Hetzer | G02B 6/4442 |
| | | | 385/100 |
| 2011/0168716 A1* | 7/2011 | Stransky | H02G 3/185 |
| | | | 220/484 |
| 2011/0211799 A1* | 9/2011 | Conner | G02B 6/4471 |
| | | | 385/135 |
| 2011/0262095 A1* | 10/2011 | Fabrykowski | G02B 6/4466 |
| | | | 385/135 |
| 2013/0034333 A1* | 2/2013 | Holmberg | G02B 6/445 |
| | | | 385/135 |
| 2016/0025260 A1* | 1/2016 | Chen | H02G 3/14 |
| | | | 248/188.1 |

* cited by examiner

STUBBED TERMINAL HOUSING FOR COMMUNICATIONS VAULT OR PEDESTAL

CROSS-REFERENCE TO RELATED APPLICATION(S)

This application claims priority to and the benefit of U.S. Provisional Patent Application No. 62/329,050 filed Apr. 28, 2016, the entire contents thereof are incorporated herein by reference.

FIELD OF THE INVENTION

The present invention is directed to buried and underground communication transmission lines and related devices, and more particularly to a stubbed terminal housing for fiber optic transmission lines for use in communication vaults including underground or grade level boxes including those incorporating a pedestal housing.

BACKGROUND OF THE INVENTION

Various electrical and fiber optic communication transmission lines or other equipment used for buried and underground utilities are commonly contained in enclosures that protect the underground wiring cables, fiber taps and splices, service lines, etc. from the environment. Initial construction often requires installation of such a below-ground enclosure, commonly referred to as a grade level utility vault or box. At a later date, if services are to be provided to the premises, the cover for the grade level box is removed and connections are made inside and/or in the above-ground pedestal housing mounted on the grade level box. The above-ground connections are protected from the weather but also must be protected from vandalism and tampering. There is also a need to provide a pedestal housing assembly that can be readily installed and opened to facilitate further connections and/or service with minimal time and labor costs.

The present invention is applicable to any system for storing and protecting underground or buried electrical conductors and devices from the environment and for facilitating access to them while making further connections, providing service, making new installations, and the like. The invention is applicable to electrical utility connections normally using buried or underground lines or connections such a cable TV, data transmission lines, various types of telecommunications, optical fiber connections, commonly referred to as "fiber to the premises," services lines, water meters, electrical power distribution, and other utilities equipment.

One embodiment of the invention provides an optical fiber distribution and vault system for making service connections to optical fiber contacts initially contained in a grade level box. A pedestal housing can be incorporated with the vault or box which is used to bring the fiber taps and splices above ground. Incorporated within the vault or box or in the pedestal housing are tethered or stubbed fiber optic terminals, however the current design for such terminals are not ideal for use in utility vault or box and pedestal housing deployment. Commercially available stubbed terminals have angled ports which create closure cover interference making them impractical for use for both pedestal and grade level vault deployments. Consequently, a need exists for an improved stubbed fiber optic terminal which is suitable for use in both pedestal housing and grade level vault deployments.

SUMMARY OF THE INVENTION

One embodiment of the invention comprises a tethered or stubbed fiber optic terminal housing for deployment in a grade level box/utility vault or a pedestal housing which includes a main housing and an attachment portion for providing a slip fit with a pedestal state located within the pedestal housing. Alternatively the housing can be mounted on a bracket within the pedestal or vault or attached directly to a pedestal faceplate or the wall of the vault by a threaded fastener. The terminal housing includes an interior cavity and a plurality of openings where the main fiber optic cable can enter into the housing through an opening and be split or separated such that individual fibers of the fiber optic cable can exit the housing individually through an array of stubbed ports allowing the individual fibers to make connections to other locations within the pedestal or vault.

DETAILED DESCRIPTION

Figure 1:
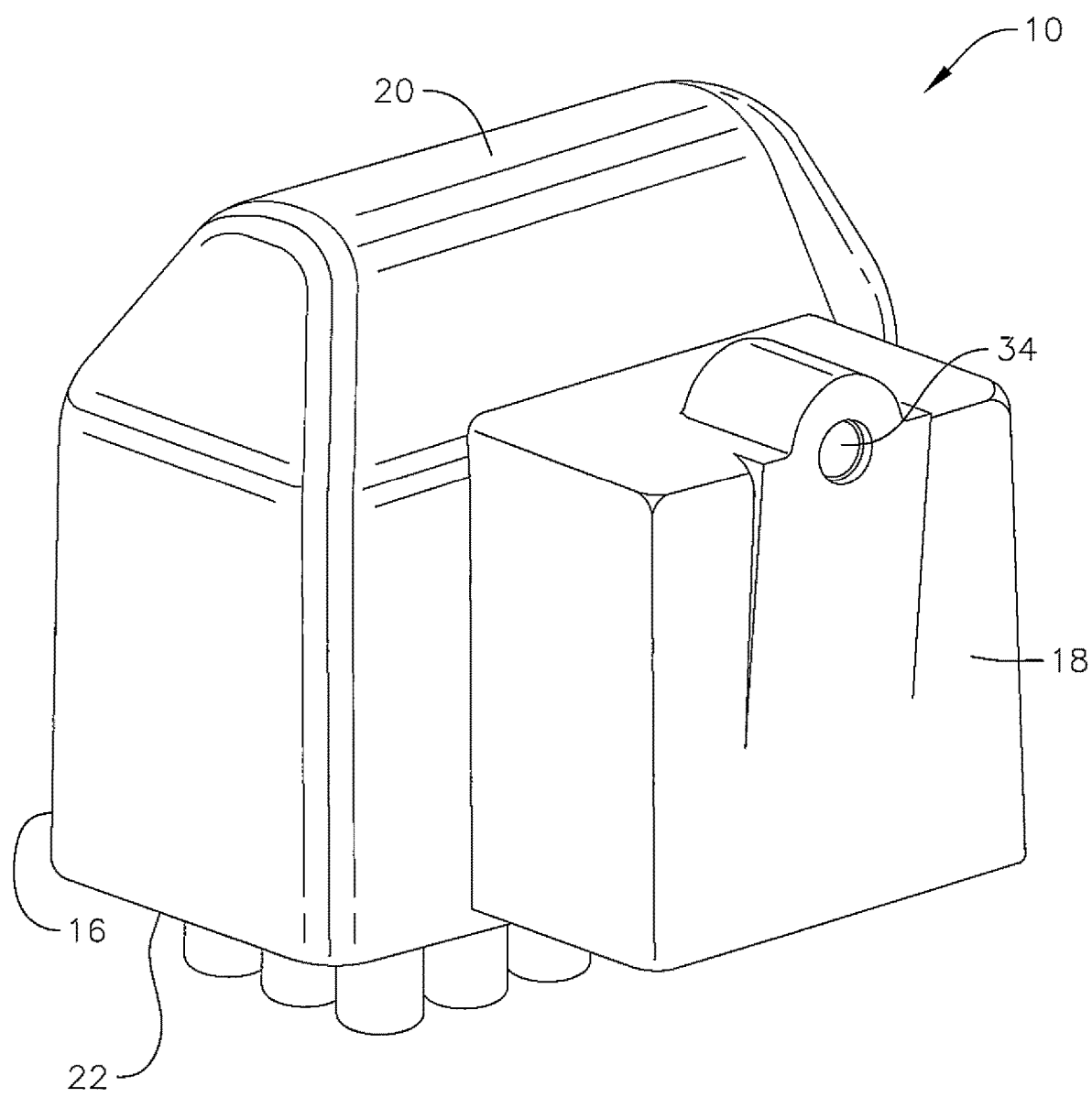
FIG. 1 is a perspective view of the stubbed terminal housing of the present invention.
Figure 2:
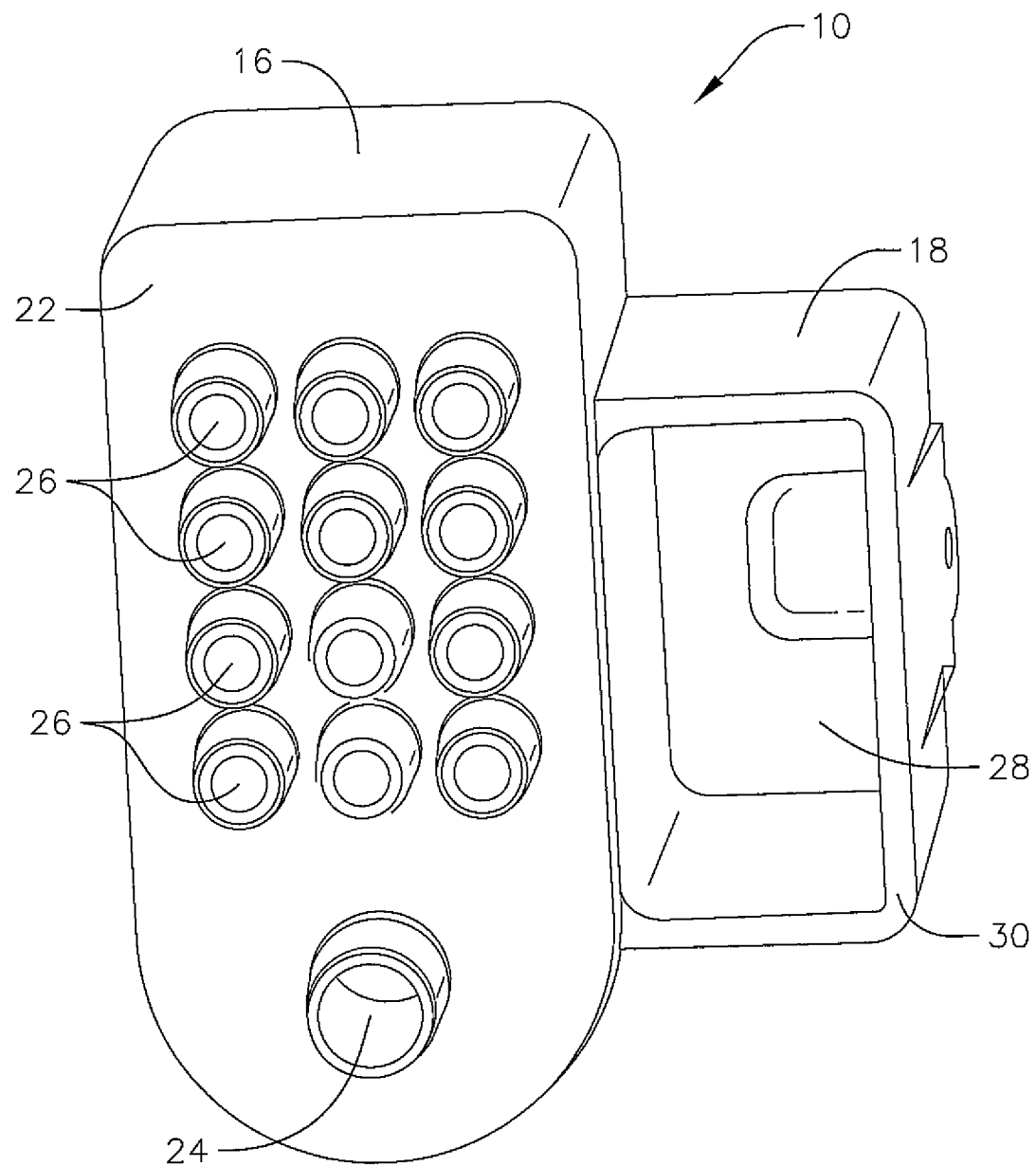
FIG. 2 is a bottom view of the terminal housing of FIG. 1.
Figure 3:
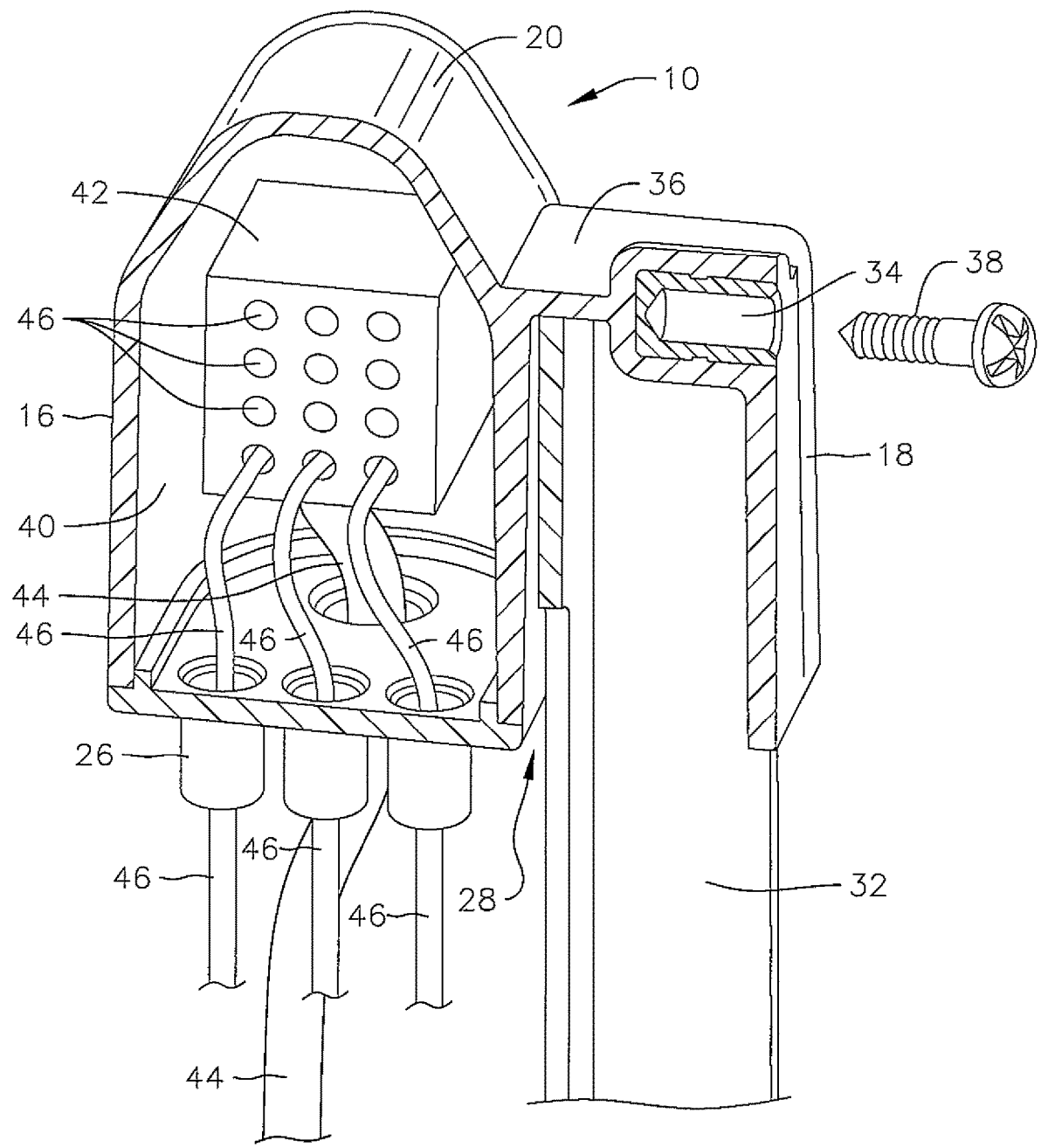
FIG. 3 is a cross sectional view of the terminal housing of FIG. 1.
Figure 4:
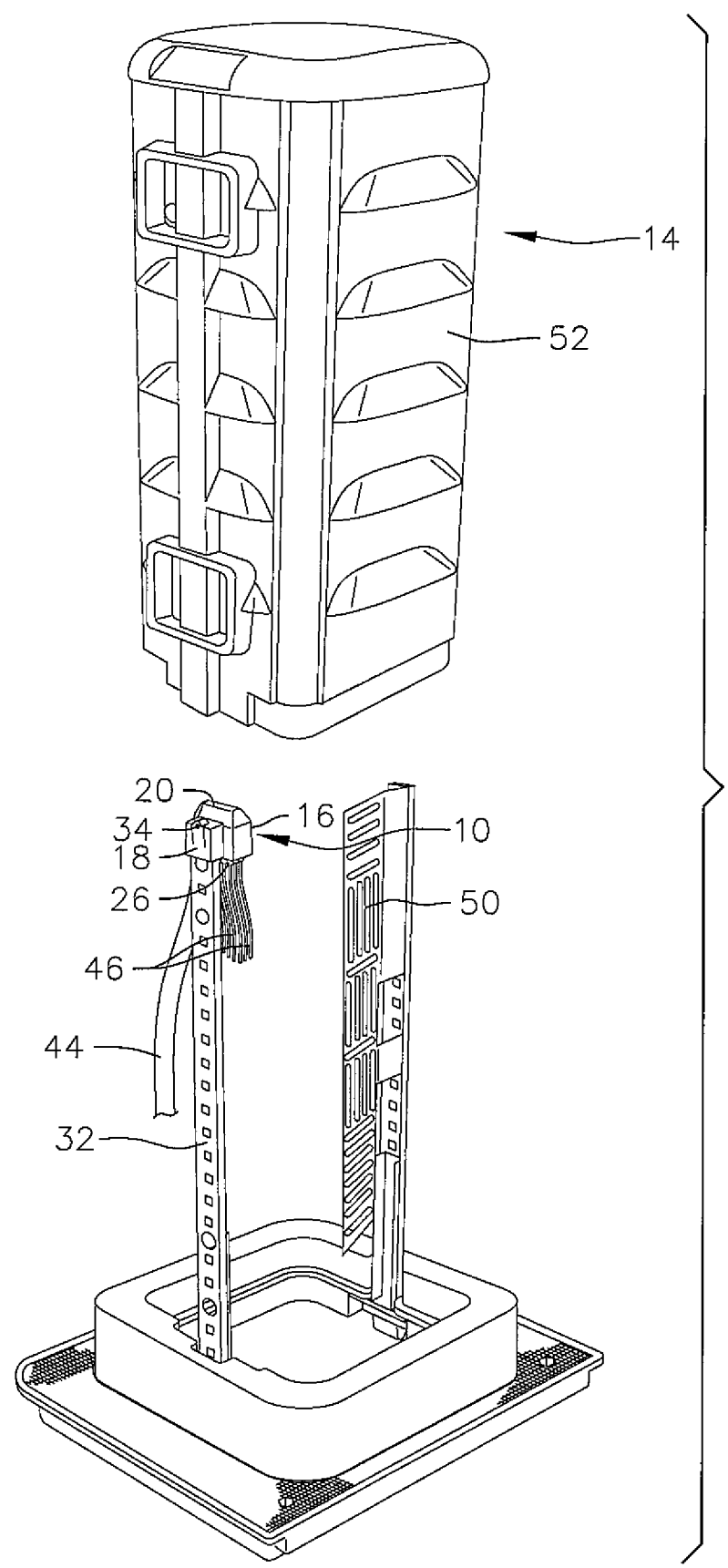
FIG. 4 is an exploded view of a pedestal housing incorporating the terminal housing of FIG. 1.
Figure 5:
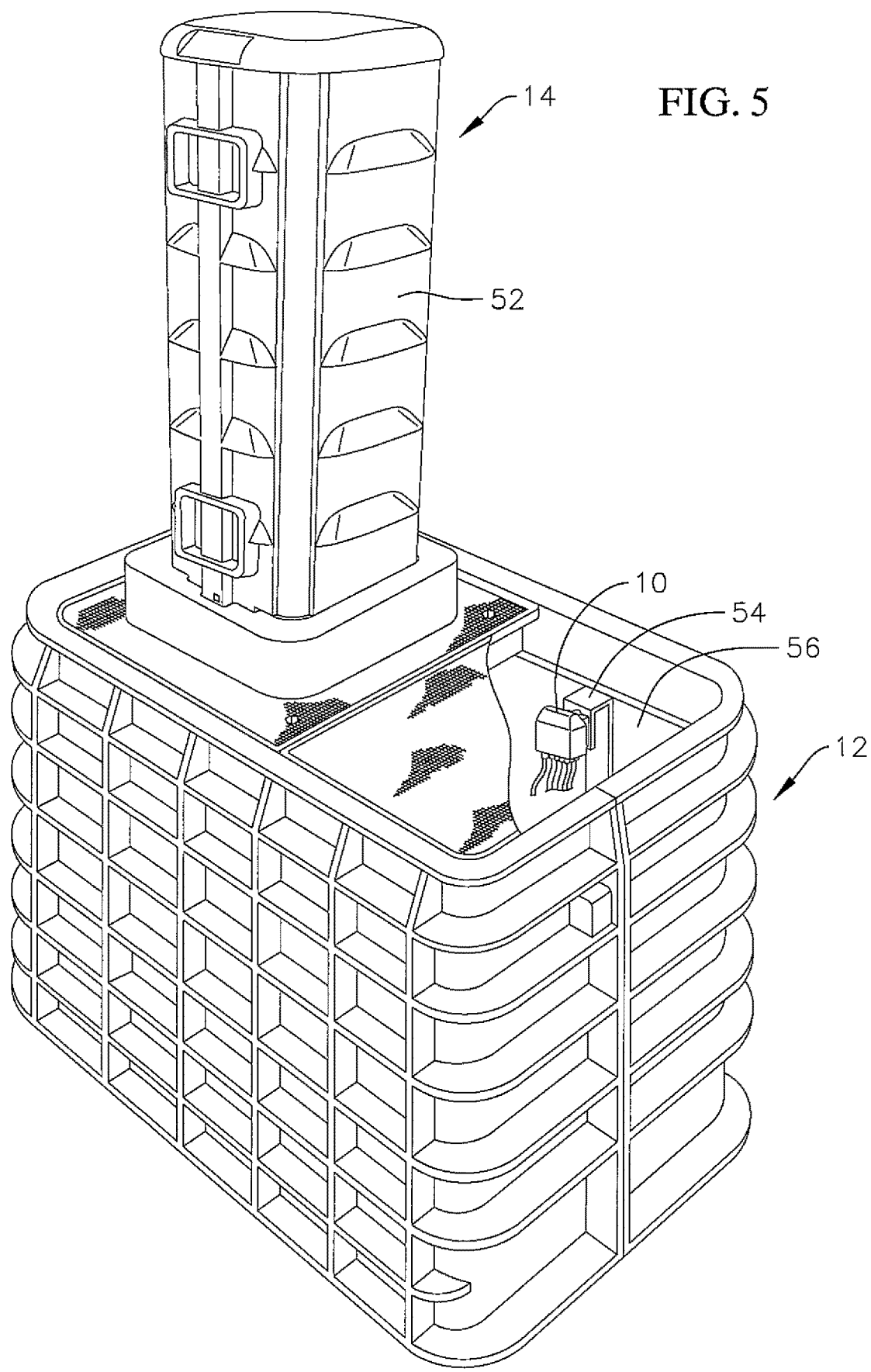
FIG. 5 is a perspective view of a pedestal housing and vault combination wherein the terminal housing of FIG. 1 is positioned within the vault.

As shown in FIGS. 1 through 3 the present invention is directed to a stubbed terminal housing 10 for use in a grade level communications vault 12 and/or pedestal housing assembly 14 as illustrated in FIGS. 4 and 5. The stubbed terminal housing includes a main body portion 16 and an attachment portion 18. The main body portion includes a domed upper surface 20 and a substantially flat lower surface 22 having a main fiber optic cable port 24 extending perpendicularly downward therefrom and an array of secondary fiber optic fiber ports 26 also extending perpendicularly downward therefrom. As illustrated in FIG. 2, there is an array of 12 secondary fiber ports, however this number can vary depending upon the particular application. The housing typically is made of plastic which can be molded although other materials and manufacturing processes can be utilized.

The attachment portion 18 includes a cavity 28 formed by an opening in its lower surface 30 so that the housing can be mounted on top of a pedestal stake 32 as shown in FIG. 3. Attachment portion 18 also includes a fastener bore 34 formed along its upper surface 36 for receipt of a mechanical fastener 38 for attachment applications discussed subsequently herein.

The main body portion 16 is hollow in that the bottom section 22 attaches to the domed section 20 to provide a hollow interior cavity 40 in which a signal splitter 42 can be positioned wherein the fiber optic cable 44 that enters into the housing through main fiber optic cable port 24 attaches and individual fiber optic fibers 46 extend off the splitter and exit the cavity 40 through secondary fiber optic fiber ports 26. For the example illustrated in FIG. 3, the splitter 42 is 1×12 splitter thereby splitting the signal carried by cable 44 into twelve signals through each of individual fibers 46. In other applications no splitter is contained within the cavity of the housing but the cavity serves as the location to fan out the individual optic fibers 46 from cable 44 for the particular communications application.

Referring to FIGS. 4 and 5 the stubbed terminal housing 10 can be positioned on a pedestal stake 32 within the pedestal housing 14 with a slip fit by positioning the attachment portion 18 on an end of the terminal housing. Alternatively, if the pedestal stake is damaged or otherwise not available for mounting, the housing can be attached by fastener 38 to a bracket 50 or directly to a pedestal faceplate 52. As shown in FIG. 5 when the stubbed terminal housing 10 is used in the grade level vault 12 the threaded fastener 38 can be used to mount the housing to a bracket 54 or directly to a wall 56 of the vault. By incorporating the stubbed terminal housing for transitioning a fiber optic cable into individual fibers it provides the ideal layout and allows the grade level vaults and pedestal housings to be smaller and more compact.

Although the present invention has been described and illustrated with respect to an embodiment thereof, it is to be understand that changes and modifications can be made therein which are within the full intended scope of the invention as hereinafter claimed. For example, the cable inlet port, although illustrated as circular, can be oval or slotted in shape to accommodate other forms of fiber optic cables, such as ribbon cables. Similarly, the fiber optic fiber outlet ports can be positioned on another surface of the housing depending upon the particular application to efficiently utilize the space provided in the pedestal or communications vault.

What is claimed is:

1. A stubbed terminal housing for attachment within a utility vault or a utility vault pedestal for fiber optic cable management within the utility vault or within the utility vault pedestal comprising:
   a housing having a body portion having a housing cavity, the housing having a cylindrical fiber optic cable port integrally extending from the body portion away from the housing cavity for receipt and entry of a fiber optic cable into the housing cavity and a plurality of cylindrical fiber optic fiber ports integrally extending from the body portion away from the housing cavity for receipt and for exiting of individual fiber optic fibers out of the housing cavity; and
   an integral mounting portion attached to and extending from a side wall of the body portion away from the housing cavity, the integral mounting portion includes a top wall and side walls forming a mounting portion cavity for receipt of a bracket in the utility vault or a pedestal stake within the utility vault pedestal into the mounting portion cavity for attachment of the stubbed terminal housing.

2. The housing of claim 1 wherein the mounting portion includes a fastener received within a bore through a side wall in the mounting portion and into the bracket in the utility vault or the pedestal stake within the utility vault pedestal.

3. The housing of claim 1 wherein the fiber optic cable port and the plurality fiber optic fiber ports extend perpendicularly from a lower surface of the body portion.

4. The housing of claim 1 wherein the fiber optic cable port has a diameter larger than a diameter of the fiber optic fiber ports.

5. The housing of claim 1 further comprising a signal splitter positioned in the housing cavity of the body portion of the housing.

6. A communications pedestal comprising:
   a faceplate;
   a pedestal stake positioned within the communications pedestal;
   a stubbed terminal housing for fiber optic cable management within the communications pedestal having a body portion, a cavity within the body portion, a cylindrical fiber optic cable port integrally extending from the body portion away from the cavity for receipt and entry of a fiber optic cable into the cavity, a plurality of cylindrical fiber optic fiber ports integrally extending from the body portion away from the cavity for receipt and exiting of individual fiber optic fibers out of the cavity, and a mounting portion extending from a side wall of the body portion, the mounting portion having a top wall and side walls forming a mounting portion cavity together with a side wall of the body portion for receipt of an end of the pedestal stake within the mounting portion cavity for attaching the stubbed terminal housing to the pedestal stake.

7. The communications pedestal of claim 6 wherein the mounting portion includes a fastener engaging the pedestal stake through a bore within the mounting portion.

8. The communications pedestal of claim 6 further comprising a signal splitter positioned in the cavity of the body portion of the stubbed terminal housing.

9. The communications pedestal of claim 6 wherein the fiber optic cable port and the plurality of fiber optic fiber ports extend perpendicularly from a lower surface of the body portion.

10. A communications vault comprising:
    a plurality of substantially vertical sidewalls;
    a bracket attached to at least one vertical side wall of the plurality of side walls of the communications vault; and
    a stubbed terminal housing for fiber optic cable management within the communications vault having a body portion, a cavity within the body portion, a cylindrical fiber optic cable port integrally extending from the body portion away from the cavity for receipt and entry of a fiber optic cable into the cavity, a plurality of cylindrical fiber optic fiber ports integrally extending from the body portion away from the cavity for receipt and exiting of individual fiber optic fibers out of the cavity, and a mounting portion extending from a side wall of the body portion, the mounting portion having a top wall and side walls forming a mounting portion cavity together with the side wall of the body portion for receipt of an end of the bracket within the mounting portion cavity for attaching the stubbed terminal housing to the communications vault.

11. The communications vault of claim 10 wherein the mounting portion includes a fastener for engaging the bracket through a bore within the mounting portion.

12. The communications vault of claim 10 further comprising a signal splitter positioned within the cavity of the body portion of the stubbed terminal housing.

13. The communications vault of claim 10 wherein the fiber optic cable port and the plurality of fiber optic fiber ports extend perpendicularly from a lower surface of the body portion.

* * * * *

UNITED STATES PATENT AND TRADEMARK OFFICE
CERTIFICATE OF CORRECTION

PATENT NO. : 10,663,688 B2
APPLICATION NO. : 15/473448
DATED : May 26, 2020
INVENTOR(S) : Timothy S. Safranek et al.

Page 1 of 1

It is certified that error appears in the above-identified patent and that said Letters Patent is hereby corrected as shown below:

On the Title Page

Item [73], delete "Commerical" and insert -- Commercial --

Signed and Sealed this
Seventeenth Day of September, 2024

Katherine Kelly Vidal
*Director of the United States Patent and Trademark Office*